Figure 3:
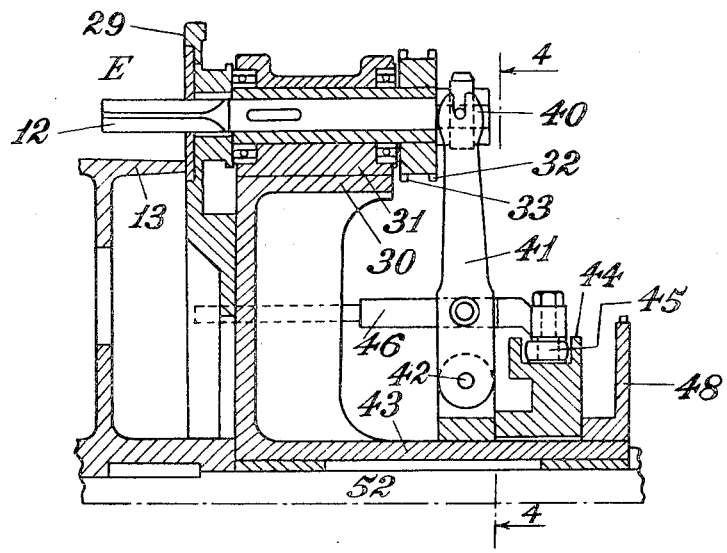

Sept. 19, 1950 D. BRANDER ET AL 2,522,599
SPINDLE MACHINE FOR MOLDING DOUGH
Filed Oct. 26, 1946 3 Sheets-Sheet 1
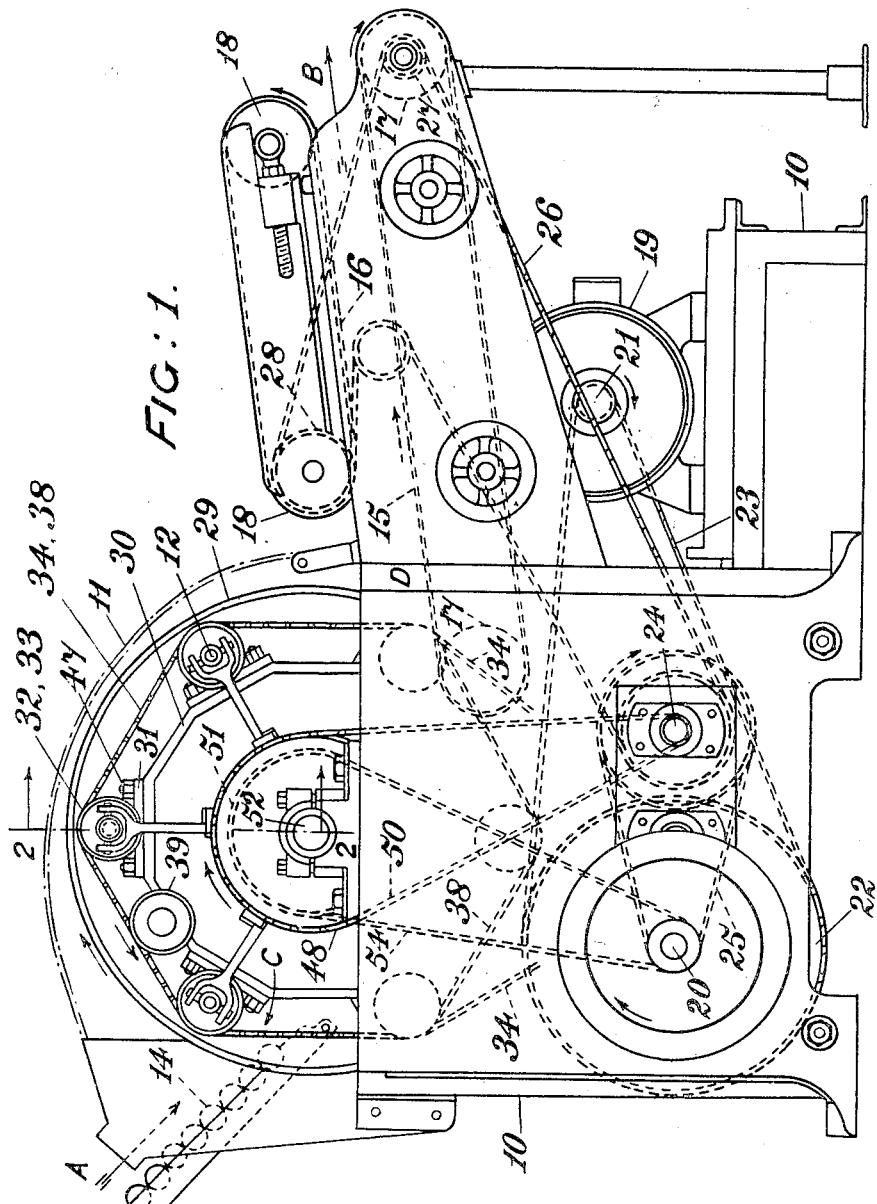
Inventors:
David Brander
Hugh Hamill
By [signature]
Attorney.

Sept. 19, 1950     D. BRANDER ET AL     2,522,599
SPINDLE MACHINE FOR MOLDING DOUGH
Filed Oct. 26, 1946     3 Sheets-Sheet 2
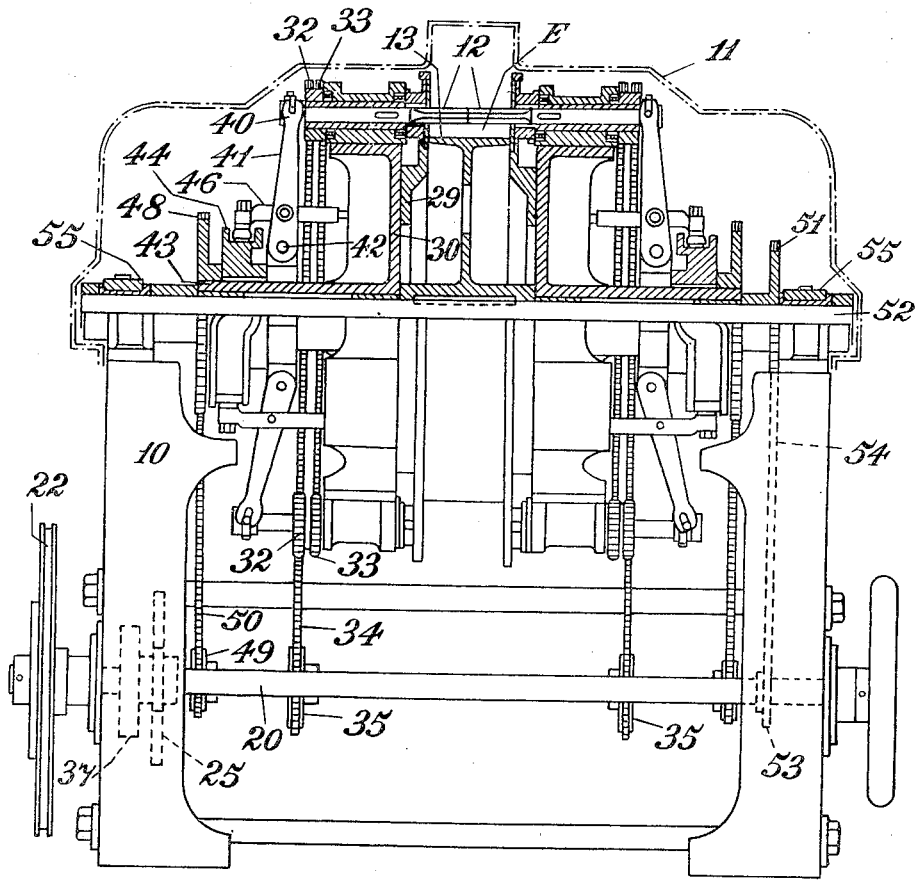
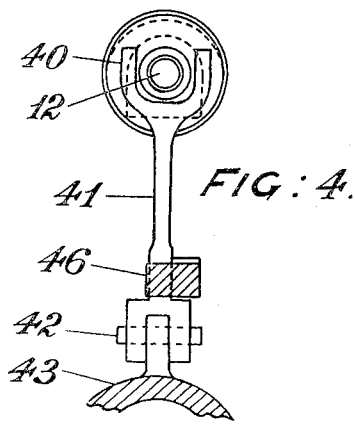
Inventors:
David Brander
Hugh Hamill
By J.G. Jochum
Attorney Sept. 19, 1950      D. BRANDER ET AL      2,522,599
SPINDLE MACHINE FOR MOLDING DOUGH Filed Oct. 26, 1946      3 Sheets-Sheet 3

Inventors:
David Brander
Hugh Hamill
By John L. Jochum Jr.
Attorney

Patented Sept. 19, 1950

2,522,599

UNITED STATES PATENT OFFICE 2,522,599

SPINDLE MACHINE FOR MOLDING DOUGH

David Brander and Hugh Hamill, Glasgow, Scotland, assignors to William Beattie Limited, Glasgow, Scotland Application October 26, 1946, Serial No. 705,894
In Great Britain April 6, 1945

Section 1, Public Law 690, August 8, 1946
Patent expires April 6, 1965

10 Claims. (Cl. 107—9)

This invention relates to spindle machines for moulding dough preparatory to baking loaves. The machines to which the invention relates are of a type comprising a plurality of rotary spindles that are journalled in rotatable carriers, travel in an endless circuit around a rotating drum and in their travel carry batches (that is, pieces) of dough, previously divided-out, from the feed-in side of the machine to the discharge side thereof, each spindle cooperating with the drum to roll-up and mould a batch of dough into a condition and shape suitable for subsequent baking, usually after passing through proofing apparatus. Such machines are sometimes known as "multi-spindle moulding machines."

In machines of the type stated the spindles work in pairs, each pair consisting of two end-to-end spindles which are independently rotated and which are journalled in rotatable carriers. These carriers are provided with annular faces through which the spindles project when operative and which form in conjunction with the peripheral surface of the drum a rectangular-section annular channel. It is in said channel that each batch of dough is worked upon whilst passing between the feed-in and discharge points. It will be apparent that the spindles perform a planetary motion; that is to say, each spindle rotates with its carrier about the central axis of the machine and also rotates about its own axis.

In machines of the type stated as heretofore constructed the rotating spindles, their carriers and the drum are driven by gearwheels. It has been found necessary to design for work in association with each carrier a large gearwheel of considerably complexity to act as the driving wheel of a series of planet-wheels connected to the spindles. The gearwheels in general and said large gear-wheel in particular are therefore of special construction and in the event of damage can be replaced only by specially made substitute parts. Moreover, the assembly of gearwheels at each side of the machine constitutes a complex barrier obstructing access to the spindles and associated parts. In consequence, inspection and removal of the working parts present serious difficulties and even if one possesses spare parts the work of replacement is laborious and time-absorbing. This is a serious defect of any such machine in a bread baking system, because stoppage due to a breakdown means accumulation of dough that ought to be worked upon and delivered by the machine in proper time relationship with the remainder of the system.

An object of this invention is to provide a machine of the type stated in which the spindles of each rotary carrier are connected to sprocket-wheels arranged as a circular series in the carrier, and in which said sprocket-wheels as they travel round their circuit with the spindles are driven so as to rotate about their own axes by a driving sprocket-wheel through a chain drive wrapped round the series. Such an arrangement ensures that the space within the endless circuit in which the spindle-sprockets work is or can be left wholly or practically unobstructed by spindle-rotating parts.

Another object is to have the spindles of each rotary carrier journalled in bearings detachably mounted on the carrier so that on slackening the chain drive, one can speedily detach a bearing and remove the bearing and spindle as a complete unit from the carrier; and if necessary one can attach a substitute unit.

Another object is to have a chain drive comprising a main chain and an auxiliary chain both working at the same speed, the main chain extending from a driving sprocket-wheel round sprocket-wheels on at least those spindles that are operative for the time being and the auxiliary chain extending round all the sprocket-wheels to maintain any idle spindle rotating in unison with the others.

Figures 5, 6:
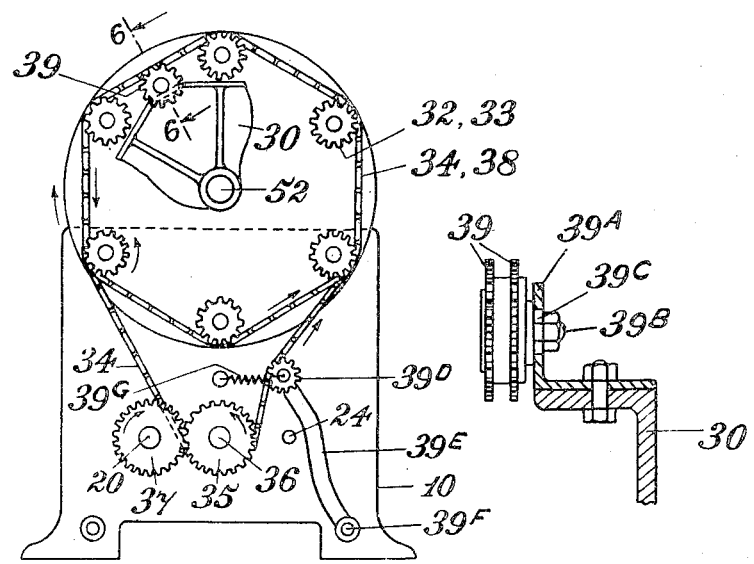

The invention will now be described by way of example with reference to the accompanying drawings, in which:

Fig. 1 is a front elevation of a multiple spindle machine, a cover being removed to expose certain working parts. Fig. 2 is a sectional end elevation of the machine, the section being on the line 2—2 of Fig. 1. Fig. 3 is a fragmentary section showing to a larger scale parts already shown in Fig. 2. Fig. 4 is a detail view, being a section on the line 4—4 of Fig. 3. Fig. 5 is a diagram showing to a smaller scale a chain-drive as viewed in Fig. 1. Fig. 6 is a detail view, being a section on the line 6—6 of Fig. 5 and being to a larger scale.

The machine shown comprises a frame 10 supporting the working parts and closed on top by a light cover 11 whose outline is indicated by dot-dash lines in Figs. 1 and 2. The machine has a plurality of rotary spindles 12 that travel in an endless circuit around a rotating drum 13 and in their travel carry batches of dough, previously divided-out, from the feed-in side of the machine to the discharge side thereof. The batches are each supplied in ball-form, and they are fed to the machine by way of an inclined conveyor consisting of a series of rollers 14, (Fig. 1). The discharge side of the machine is provided with a pair of conveyors 15 and 16 consisting of endless belts, or "compression bands"

as they are called, wrapped respectively around pairs of pulleys 17 and 18, the lower conveyor 15 travelling at greater speed and the active lower stretch of the upper conveyor 16 travelling in the direction opposite to the discharge direction. The batches of dough are fed as indicated by the arrow A to the conveyor 14 and are delivered at the feed-in point C to the travelling rotary spindles 12. The spindles 12 cooperate with the drum 13 in known manner to roll-up and mould the batches of dough in the annular channel E, of which the drum 13 forms the bottom, into a condition and shape suitable for subsequent baking. The batches are delivered in succession from the channel E at the discharge point D to the lower conveyor 15, by which they are conveyed between the lower and upper stretches of the two conveyors 15 and 16, respectively. As the batches advance, they are rolled and consolidated by the action of the conveyor stretches. Finally, the batches are delivered from the machine at B.

The working parts of the machine are all driven from an electric motor 19 mounted on the frame 10. The transmission means between the motor and the working parts comprises mainly chain-and-sprocket gearing. The machine has a main driving shaft 20 which is driven from the motor 19 by gearing consisting of a small sprocket 21 on the motor shaft, a large sprocket 22 on the main shaft 20 and a chain 23. The machine also has a counter-shaft 24 driven at a lower speed than the main shaft 20 by chain-and-sprocket gearing 25. The counter-shaft 24 operates a chain-and-sprocket drive including a chain 26, a sprocket 27 on the shaft of one of the pulleys 17 of the lower conveyor 15, and a sprocket 28 on the shaft of one of the pulleys 18 of the upper conveyor 16.

In the example, the machine has six pairs of spindles 12 equispaced round their carriers. Each carrier comprises a ring 29 secured to a large polygonal casting 30 to which are secured by studs the bearing blocks 31 in which the spindles 12 are journalled. The two rings 29 form the walls of the annular channel E whose bottom is formed by the drum 13. Each spindle has two similar sprocket-wheels 32 and 33 arranged side by side, one being a main wheel and the other an auxiliary wheel. The main sprocket-wheels 32 are wrapped by a main driving chain 34 which however extends freely past that sprocket-wheel or sprocket-wheels which for the time being is or are the lowermost of the series and engages instead a driving sprocket-wheel 35 (Figs. 2 and 5) on an intermediate shaft 36 driven by the main driving shaft 20 through intermeshing gearwheels 37 (Figs. 2 and 5). All of the auxiliary sprocket-wheels 33 are wrapped by an auxiliary chain 38 the function of which is to maintain the lowermost spindles rotating at the same speed as the others, which are positively driven by the main chain drive 34. Each of the chain drives 34 and 38 extends round an adjustable tensioning wheel 39 serving to maintain both chains at appropriate tautness. As Fig. 6 shows, the shaft of wheel 39 is adjustably secured to a bracket 39A on the casting 30 by a screwed pin 39B passing through a radial slot 39C in said bracket. Moreover, a jockey wheel 39D assists in maintaining the main driving chain 34 taut. This jockey wheel 39D is journalled at the free end of an arm 39E pivotally mounted at 39F on the frame 10 of the machine (see Fig. 5), a spring 39G serving to pull the wheel 39D against the chain 34. The two chains 34, 38 extend side-by-side and follow an endless path which generally has the form of an regular hexagon, with rounded corners, but departs from said form where the main chain 34 engages the driving sprocket-wheel 35 and the jockey wheel 39D.

The spindles 12 extend beyond their bearings 31 and are engaged by the forked ends 40 of cam-operated levers 41 fulcrumed at 42 on the boss 43 of the carrier 29, 30. These levers 41 extend radially in relation to the axis of rotation of the carrier 29, 30. Each lever 41 cooperates in usual manner with a stationary cam 44. The followers to the cam are rollers 45, each carried at the end of a guide rod 46 which is slidably mounted in its carrier 29, 30 and is pivotally connected to its lever 41 the action of which is, firstly to project each spindle into operative relationship with the other spindle of the same pair as they are about to travel past the feed-in point where they receive a previously divided-out batch of dough and, secondly, to withdraw the spindle at the discharge point.

The entire arrangement is such that each spindle 12 and its bearing-block 31 constitute a unit which can be removed from the machine simply by slackening the chains, unscrewing the stud-nuts 47 (Fig. 1) of the bearing blocks 31 and lifting out the unit. To replace a unit these steps are reversed.

Each carrier 29, 30 is rotated by a chain drive, there being one of these drives at each side of the machine and each of them comprises a driven sprocket-wheel 48 on the boss 43 of the carrier, a driving sprocket-wheel 49 on the counter-shaft 24 and a chain 50 engaging both wheels.

The drum 13 is also driven by a chain drive comprising a driven sprocket-wheel 51 on the drum shaft 52, a driving sprocket-wheel 53 on the driving shaft 20 and a chain 54 engaging both wheels.

The chain-drive and other mechanism at each side of the machine is the same as at the other side, except that there is a drum chain-drive 51, 53, 54 only at one side, and the carriers and spindles at both sides work in exact unison.

The drum-shaft 52 is journalled at its ends in bearings 55 on the machine frame 10 and serves as a central support for the carriers, whose bosses 43 are freely journalled on the drum-shaft.

In the example, the gear ratios are such that the drum rotates at 61 revolutions per minute, the carriers at 13.4 revolutions per minute, and the spindles at 266 revolutions per minute. The drum and carriers rotate in the same direction, their upper faces moving from the feed-in point to the discharge point in an arc which constitutes the working zone of the annular channel formed by them. The chains 34, 38 are driven in the opposite direction to the drum 13 and carriers 29, 30, so that the spindles also rotate in said opposite direction. In Figs. 1 and 5, arrows indicate the directions of motion of the various working parts.

We claim:

1. A spindle machine for moulding dough comprising a rotary drum and means for rotating it, a pair of opposed rotary carriers and means for rotating them in unison, rotary spindles journalled in said carriers and carried thereby to travel in an endless circuit round said drum, said spindles being arranged in pairs and each pair consisting of two opposed co-axial spindles having means for mutually advancing and withdrawing them to engage and release a batch of dough supplied to said drum, two circular series of 2,522,599 sprocket-wheels individual to the spindles of said carriers and travelling therewith, there being one such circular series of sprocket-wheels for the spindles of each carrier, driving sprocket wheels arranged in stationary locations and each coplanar with one of the circular series of travelling sprocket-wheels, and driving chains each wrapping one of the driving sprocket-wheels and sprocket-wheels of the associated circular series, said chains in a revolution of said carriers engaging each of the last-mentioned sprocket-wheels and transmitting to said spindles a rotary motion about their individual axes additional to their travel round said drum.

2. A spindle machine for moulding dough comprising a rotary drum, rotary carrier means arranged at opposite sides of said drum and extending outwards therefrom so as to form therewith an annular dough-receiving channel, means for driving said drum and carrier means at substantially different speeds of rotation, rotary spindles journalled in said carrier means and carried thereby to travel in an endless circuit round said channel, means for moving said spindles to engage and release successive batches of dough, a circular series of sprocket-wheels individual to the spindles and travelling therewith, a driving sprocket-wheel arranged in a stationary location and coplanar with said circular series of travelling sprocket-wheels, and a driving chain wrapping said driving sprocket-wheel and sprocket-wheels of the circular series, said chain in a revolution of said carrier means engaging each of the last-mentioned sprocket-wheels and transmitting to said spindles a rotary motion about their individual axes additional to their travel round said channel.

3. A spindle machine for moulding dough comprising a drum, means for rotating said drum in a given direction, a pair of carriers arranged at opposite sides of said drum and extending outwards therefrom so as to form therewith an annular channel, means for rotating said carriers in said direction but at a substantially lower speed than said drum, a plurality of pairs of withdrawable spindles which roll-up batches of dough fed to said channel and which are journalled in said carriers so as to travel in a circuit as the carriers rotate, sprockets connected and travelling with said spindles, chain drives wrapping said travelling sprockets, and means for operating said chain drives in the direction opposite to said given direction so that said spindles also rotate in said opposite direction about their own axes as they travel in their circuit.

4. A spindle machine for moulding dough comprising a rotatable drum, a pair of rotatable carriers, means driving said drum and said pair of carriers at substantially different speeds of rotation, groups of bearings detachably mounted on said carriers, the group of bearings on each carrier being equispaced angularly around the axis of rotation thereof, pairs of withdrawable spindles which roll up batches of dough fed to said drum and which are respectively journalled in said bearings so as to travel in a circuit as the carriers rotate, and so as to be removable from the machine each with its bearing as a unit when said bearing is detached, sprockets connected and travelling with said spindles, chain drives wrapping said travelling sprockets, and means for operating said chain drives so that said spindles rotate about their own axes as they travel in their circuit.

5. A spindle machine for moulding dough comprising a rotary drum and means for rotating it, a pair of opposed rotary carriers and means for rotating them in unison, said drum being arranged between said carriers and said carriers extending outwards beyond said drum so as to form therewith an annular dough-receiving channel and the respective rotating means driving said drum at a substantially greater speed than said carriers, groups of bearings detachably mounted on said carriers, the group of bearings on each carrier being equispaced angularly around the axis of rotation thereof, rotary spindles journalled in said bearings and carried thereby so as to travel in an endless circuit round said channel and so as to be removable from the machine each with its bearing as a unit when said bearing is detached, said spindles being arranged in pairs and each pair consisting of two opposed co-axial spindles having means for mutually advancing and withdrawing them to engage and release a batch of dough, a circular series of sprocket-wheels individual to the spindles of each carrier and travelling therewith, a driving sprocket-wheel arranged in a stationary location and coplanar with each circular series of travelling sprocket-wheels, and a driving chain wrapping each driving sprocket-wheel and sprocket-wheels of the associated circular series, said chain in a revolution of said carriers engaging each of the last-mentioned sprocket-wheels and transmitting to said spindles a rotary motion about their individual axes additional to their travel round said channel.

6. A spindle machine as claimed by claim 2 having a jockey sprocket-wheel engaging said driving chain at a place in proximity to the driving sprocket-wheel, a support in which said jockey sprocket-wheel is journalled and which has a stationary anchorage, and spring means acting on said support to hold said jockey sprocket-wheel against said driving chain to maintain it taut.

7. A spindle machine for moulding dough comprising a rotary drum and means for rotating it, a pair of opposed rotary carriers and means for rotating them in unison, said drum being arranged between said carriers and said carriers extending outwards beyond said drum so as to form therewith an annular dough-receiving channel and the respective rotating means driving said drum at a substantially greater speed than said carriers, rotary spindles journalled in said carriers and carried thereby to travel in an endless circuit round said channel, circular series of main sprocket-wheels individual to the spindles of said carriers and travelling in circuit therewith, driving sprocket wheels arranged in stationary locations and each associated with one of the circular series of said main sprocket-wheels, driving chains each wrapping one of the driving sprocket-wheels and some of the sprocket main-wheels to maintain the main sprocket-wheels in unison of the associated circular series, said chains transmitting to the spindles of the wrapped main sprocket-wheels a rotary motion about their individual axes additional to their travel in circuit, series of auxiliary sprocket-wheels each connected to one of the main sprocket wheels and auxiliary chains respectively wrapping the series of auxiliary sprocket-wheels.

8. A spindle machine as claimed by claim 7 having jockey sprocket-wheels carried by supports anchored to a stationary location and applied to the respective driving chains to maintain them taut and sprocket-wheels adjustably mounted on the respective rotary carriers and applied to the respective auxiliary chains to maintain them taut.

9. A spindle machine for moulding dough comprising a rotary drum, rotary carrier means, means for driving said drum and carrier means at substantially different speeds of rotation, rotary spindles journalled in said carrier means and carried thereby to travel in an endless circuit round said drum, means for moving said spindles to engage and release successive batches of dough supplied to said drum, a circular series of main sprocket-wheels individual to the spindles and travelling therewith, a rotary driving sprocket-wheel arranged in a stationary location, a driving chain wrapping said driving sprocket-wheel and said main sprocket-wheels, said chain transmitting to some of said spindles a rotary motion about their individual axes additional to their travel round said drum, a series of auxiliary sprocket-wheels each connected to one of the main sprocket wheels and an auxiliary chain wrapping the series of auxiliary sprocket wheels to maintain them in unison.

10. A spindle machine as claimed by claim 9 having a jockey sprocket-wheel carried by a support with a stationary pivot and applied to said driving chain to maintain it taut and a sprocket-wheel adjustably mounted on the rotary carrier means and applied to the auxiliary chain to maintain it taut.

DAVID BRANDER.
HUGH HAMILL.

REFERENCES CITED

The following references are of record in the file of this patent:

UNITED STATES PATENTS

| Number | Name | Date |
|---|---|---|
| 1,585,724 | Lauterbur | May 25, 1926 |
| 1,620,559 | Kirchhoff | Mar. 8, 1927 |

FOREIGN PATENTS

| Number | Country | Date |
|---|---|---|
| 611,278 | Germany | Mar. 25, 1935 |
| 614,248 | Germany | June 5, 1935 |